US012722642B2

(12) United States Patent
Wakabayashi et al.

(10) Patent No.: US 12,722,642 B2
(45) Date of Patent: Sep. 1, 2026

(54) BUMP DETECTOR

(71) Applicant: TOYOTA JIDOSHA KABUSHIKI KAISHA, Toyota (JP)

(72) Inventors: Hideto Wakabayashi, Numazu (JP); Motoki Tachiiri, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/945,004

(22) Filed: Nov. 12, 2024

(65) Prior Publication Data

US 2025/0178610 A1 Jun. 5, 2025

(30) Foreign Application Priority Data

Dec. 1, 2023 (JP) ................................ 2023-203758

(51) Int. Cl.
*B60W 40/06* (2012.01)

(52) U.S. Cl.
CPC ..... *B60W 40/06* (2013.01); *B60W 2510/0657* (2013.01); *B60W 2520/10* (2013.01); *B60W 2520/105* (2013.01); *B60W 2552/35* (2020.02); *B60W 2556/50* (2020.02)

(58) Field of Classification Search
None
See application file for complete search history.

(56) References Cited

U.S. PATENT DOCUMENTS

2015/0291177 A1* 10/2015 Lee ....................... B60W 40/06 73/146
2022/0381581 A1* 12/2022 Kim ..................... B60W 40/06
2024/0328819 A1* 10/2024 Delgado Banuelos ...................... G08G 1/165

FOREIGN PATENT DOCUMENTS

JP 6561670 B2 8/2019

* cited by examiner

*Primary Examiner* — Peter D Nolan
*Assistant Examiner* — Michael F Whalen
(74) *Attorney, Agent, or Firm* — Dinsmore & Shohl LLP

(57) ABSTRACT

A bump detector for detecting a bump on a road surface where a vehicle travels, includes a processor, which acquires a motor torque of a motor connected to a tire, a tire angular acceleration, a motor angular acceleration, and speed information of the vehicle, calculates a force in a horizontal direction acting on the tire when the tire rides on the bump, and estimates a bump height in accordance with the force in the horizontal direction on a basis of bump information, in which peaks of a tire front-rear force in the horizontal direction before and after the tire rides on the bump on the road surface calculated in advance for each vehicle speed are associated with bump heights, and the speed information.

5 Claims, 3 Drawing Sheets

START

ACQUIRE DATA FROM VARIOUS SENSORS — S101

CALCULATE FORCE Fx IN HORIZONTAL DIRECTION — S102

ESTIMATE BUMP HEIGHT — S103

BUMP HEIGHT ≧ PREDETERMINED VALUE? — S104

YES → TRANSMIT TRANSMISSION INFORMATION — S105

NO → END

END

BUMP DETECTOR

CROSS-REFERENCE TO RELATED APPLICATION(S)

The present application claims priority to and incorporates by reference the entire contents of Japanese Patent Application No. 2023-203758 filed in Japan on Dec. 1, 2023.

BACKGROUND

The present disclosure relates to a bump detector.

Japanese Patent No. 6561670 discloses a technique for detecting a bump on a road surface on the basis of a detection result of a detection sensor for detecting a distance and an orientation to the road surface.

There is a need for providing a bump detector which is inexpensive and has a convenient configuration.

According to an embodiment, a bump detector for detecting a bump on a road surface where a vehicle travels, includes a processor, which acquires a motor torque of a motor connected to a tire, a tire angular acceleration, a motor angular acceleration, and speed information of the vehicle, calculates a force in a horizontal direction acting on the tire when the tire rides on the bump, and estimates a bump height in accordance with the force in the horizontal direction on a basis of bump information, in which peaks of a tire front-rear force in the horizontal direction before and after the tire rides on the bump on the road surface calculated in advance for each vehicle speed are associated with bump heights, and the speed information.

DETAILED DESCRIPTION

In Japanese Patent No. 6561670, since the bump (level difference, or step) of the road surface is detected by using the distance measuring sensor, the distance measuring sensor for detecting the level difference of the road surface must be provided separately, it could not be provided at low cost.

Hereinafter, a vehicle including a bump detector according to an embodiment of the present disclosure will be described with reference to the drawings. Note that the components in the following embodiments include those which can be substituted and easily by those skilled in the art, or those which are substantially the same. Further, the drawings referred to in the following description are only schematically illustrating the shape, size, and positional relationship to the extent that the contents of the present disclosure can be understood. In other words, the present disclosure is not limited only to the shape, size, and positional relationship exemplified in each of the figures.

Configuration of the Vehicle

Figure 1:
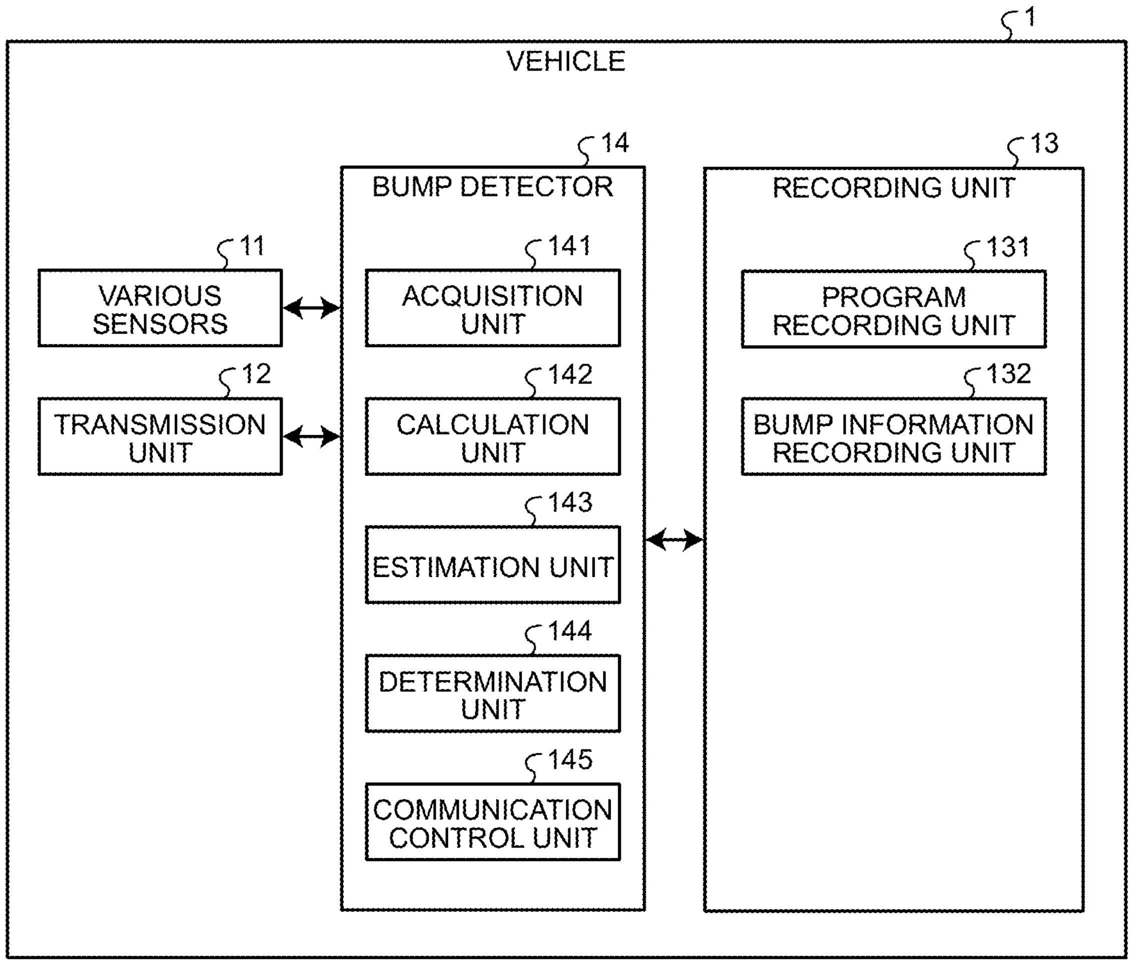
FIG. 1 is a block diagram illustrating a functional configuration of a vehicle according to an embodiment.

FIG. 1 is a block diagram illustrating a functional configuration of a vehicle according to an embodiment. The vehicle 1 illustrated in FIG. 1 is assumed as a Hybrid Electric Vehicle (HEV), a Plug-in Hybrid Electric Vehicle (PHEV) on which a motor and an engine are mounted, a Battery Electric Vehicle (BEV), a Fuel Cell Electric Vehicle (FCEV) and the like.

As illustrated in FIG. 1, the vehicle 1 includes various sensors 11, a transmission unit 12, a recording unit 13, and a bump detector 14.

The various sensors 11 detect the motor torque of the motor connected to the tire, the tire angular acceleration (rotational speed), the motor angular acceleration (resolver signal), the gear ratio of the motor and the tire and the speed information of the vehicle 1. Here, the motor is assumed as a motor generator (MG), a rotating electric machine, a drive machine, an electric motor and a motor generator. The various sensors 11 include the wheel acceleration sensor for detecting the wheel angular acceleration in the wheel of the vehicle 1 (not shown), the speed sensor for detecting the speed of the vehicle 1, the acceleration sensor for detecting the acceleration of the vehicle 1, the rotation angle sensor for detecting the motor angular acceleration, for example, a resolver or a rotary encoder, a torque sensor for detecting the torque of the motor, and a gyro sensor or the like. Furthermore, the various sensors 11 are configured by using a Global Positioning System (GPS) sensor or the like for detecting the position information of the vehicle 1.

The transmission unit 12, under the control of the bump detector 14, transmits various information toward the external server or another vehicle via a network. The transmission unit 12 is configured using a predetermined communication standard, for example, Wi-Fi (registered trademark), Bluetooth (registered trademark), or 5G (5th Generation Mobile Communication System) or the like.

The recording unit 13 is configured using a Hard Disk Drive (HDD) a Solid State Drive (SSD), a flash memory, a volatile memory, a non-volatile memory, etc. The recording unit 13 includes a program recording unit 131 and a bump information recording unit 132. The program recording unit 131 records various programs and data during processing executed by the vehicle 1 and the bump detector 14. The bump information recording unit 132 records the bump information in which the peak of the front-rear force of the tire in the horizontal direction before and after the tire riding over the bump calculated in advance for each speed of the vehicle 1 and the bump height are associated with each other.

Figure 2:
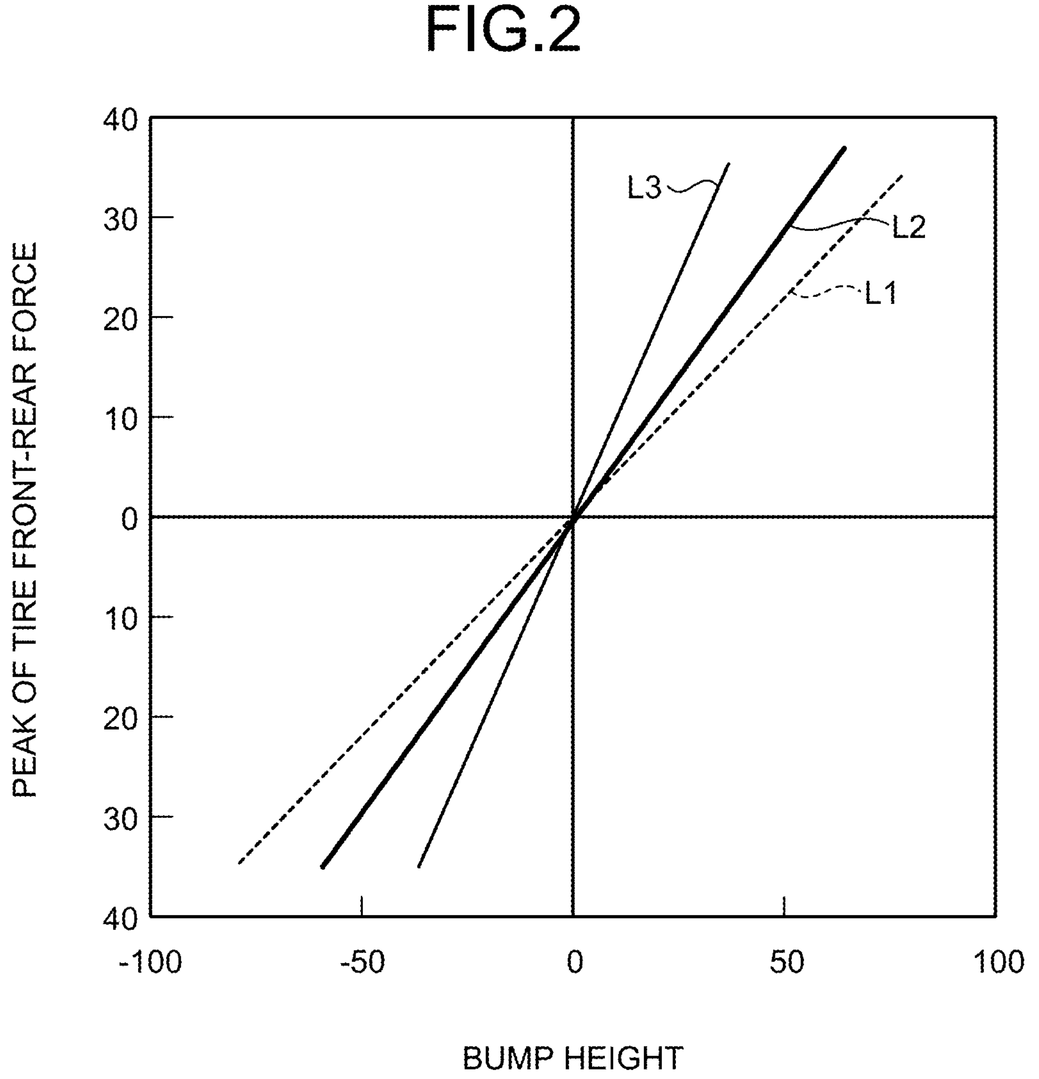
FIG. 2 is a diagram illustrating an example of the bump information recorded by a bump information recording unit according to an embodiment.

Here, the bump information recorded by the bump information recording unit 132 will be described. FIG. 2 is a diagram illustrating an example of the bump information recorded by the bump information recording unit 132. In FIG. 2, each of the linear L1 to the linear L3 illustrates the relationship between the bump height based on the direction-to-peak velocity of the horizontal front-to-back tire force before and after the tire rides on the bump of the road surface. In FIG. 2, the linear L1 illustrates the relationship between the peak of the tire front-rear force and the bump height in the case where the speed is 40 km/h, the linear L2 illustrates the relationship between the peak of the tire front-rear force and the bump height in the case where the speed is 30 km/h, and the linear L3 illustrates the relationship between the peak of the tire front-rear force and the bump height in the case where the speed is 20 km/h.

As illustrated in the straight line L1 to straight line L3 in FIG. 2, the inclination of the bump information changes according to the velocity of vehicle. Here, the bump refers to a depression, crease, ruts and irregularities, etc. The peak of the front-rear force of the tire is the maximum value of the difference between the force in the horizontal direction acting on the tire when the tire to be described later rides on the bump of the road surface and the force in the horizontal direction acting on the tire before the tire rides on the bump. Furthermore, the bump height (bump amount) is the difference (amount) between before and after the tire rides up the bump. Incidentally, in FIG. 2, although for each speed, the relationship between the peak and the bump height of the tire front-rear force for each tire diameter and type of vehicle may be obtained in advance to include the bump information.

Returning to FIG. 1, the description of the configuration of the vehicle 1 will continue. The bump detector 14 is comprised of an Electronic Control Unit (ECU) using a processor having hardware, such as memories and a Central Processing Unit (CPU). The bump detector 14 includes an acquisition unit 141, a calculation unit 142, an estimation unit 143, a determination unit 144, and a communication control unit 145.

The acquisition unit 141 acquires data from the various sensors 11. Specifically, the acquisition unit 141 acquires data including the wheel angular acceleration, the motor angular acceleration, the motor torque, the vehicle speed information of the vehicle 1, and the position information of the vehicle 1 detected by the various sensors 11.

The calculation unit 142 computes the force in the horizontal direction acting on the tire when the tire provided in the vehicle 1 rides on the step of the road surface. The calculation method to be calculated by the calculation unit 142 will be described later.

The estimation unit 143 estimates the bump height according to the force in the horizontal direction on the basis of the bump information and the speed information in which the peak and the bump height of the tire front-rear force in the horizontal direction before and after the tire that is calculated in advance for each speed of the vehicle 1 rides on the bump on the road surface.

The determination unit 144 determines whether the bump height estimated by the estimation unit 143 is equal to or greater than a predetermined value. Here, the predetermined value is a value that causes trouble in running of the vehicle 1. The predetermined value may be appropriately set by the user, the manufacturer may be appropriately set.

The communication control unit 145 causes the transmission unit 12 to transmit, to the server or another vehicle, transmission information in which the position information of the vehicle 1 acquired by the acquisition unit 141 and the transmission information associated with the bump height estimated by the estimation unit 143 are associated with each other via the network.

Processing of the Bump Detector

Figures 3, 4:
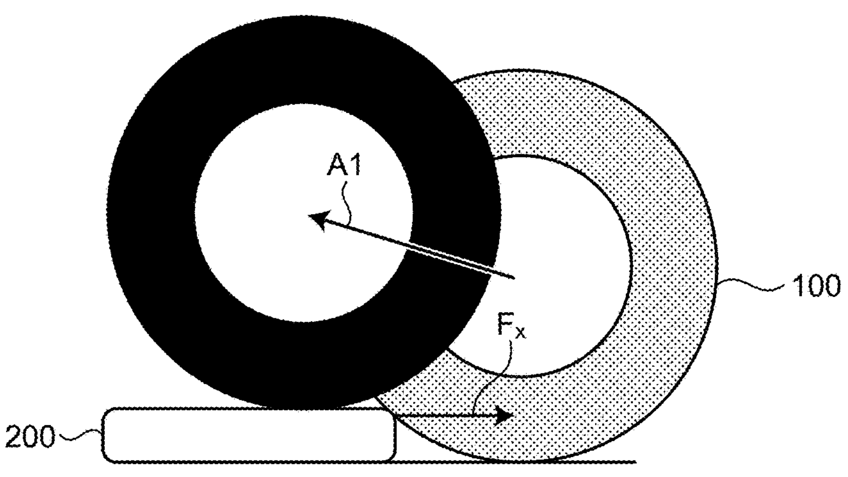
FIG. 3 is a flowchart illustrating an outline of a process performed by a bump detector according to an embodiment.
FIG. 4 is a diagram schematically illustrating the front and rear of the tire riding on a bump on a road surface.

Next, the process of the bump detector 14 executes is described. FIG. 3 is a flowchart illustrating an outline of a process performed by the bump detector 14.

As illustrated in FIG. 3, the acquiring unit 141 acquires data from the various sensors 11 (step S101). Specifically, the acquisition unit 141 acquires data including the wheel angular acceleration, the motor angular acceleration, the motor torque, the vehicle speed information of the vehicle 1, and the position information of the vehicle 1 detected by the various sensors 11 from the various sensors 11.

Subsequently, the calculation unit 142 computes the horizontal force Fx acting on the tire when the tire of the vehicle 1 rides on the bump existing on the road surface based on the data acquired by the acquisition unit 141 based on the following Formula (1) (step S102). Specifically, as illustrated in FIG. 4, the calculation unit 142 computes the horizontal force Fx acting on the tire when the tire 100 of the vehicle 1 rides on the bump 200 existing on the road surface (see A1 of an arrow) based on data acquired by the acquisition unit 141 based on the following formula (1).

$$F_x = G_r\left(\frac{T_{mg} - I_{mg} \times \omega_{mg}}{2}\right) - I_T \times \omega_T \tag{1}$$

Here, Gr indicates the gear ratio of the motor and the tire, Tmg indicates the motor torque, It indicates the tire inertia moment, Img indicates the motor inertia moment, ωt indicates the tire angular acceleration, and ωmg indicates the tire angular acceleration.

Subsequently, the estimation unit 143 estimates the bump height of the road surface on which the vehicle 1 is traveling based on the bump information recorded by the bump information recording unit 132 and the horizontal force Fx calculated by the calculation unit 142 (step S103). Specifically, the estimation unit 143 estimates the height of the bump according to the horizontal force Fx calculated by the Formula (1) by the calculation unit 142 based on the velocity information of the vehicle 1 included in the data acquired by the acquisition unit 141 and the bump information recorded by the bump information recording unit 132. For example, when the velocity information of the vehicle 1 is 40 km/h, the estimation unit 143 refers to the linear L1 of the bump information recorded by the bump information recording unit 132, and estimates the bump height corresponding to the peak of the tire front-rear force corresponding to the horizontal force Fx calculated by the calculation unit 142 in Formula (1) as the bump height of the road surface on which the vehicle 1 is traveling.

Subsequently, the determination unit 144 determines whether or not the bump height estimated by the estimation unit 143 is equal to or more than a predetermined value (step S104). When the determination unit 144 determines that the bump height estimated by the estimation unit 143 is equal to or greater than a predetermined value (Yes in step S104), the bump detector 14 proceeds to step S105 described later. On the other hand, when the determination unit 144 determines that the bump height estimated by the estimation unit 143 is not equal to or greater than the predetermined value (No in step), the bump detector 14 ends the present process.

In step S105, the communication control unit 145 transmits, via the network, the transmission information including the position information of the vehicle 1 acquired by the acquisition unit 141 and the bump height estimated by the estimating unit 143 to the server or the other vehicle to the transmission unit 12. After step S105, the bump detector 14 ends the process.

According to the embodiment described above, since the estimation unit 143 estimates the height of the bump corresponding to the force Fx in the horizontal direction calculated by the calculation unit 142 based on the speed information of the vehicle 1 included in the data acquired by the acquisition unit 141 and the bump information recorded by the bump information recording unit 132, it is possible to simplify and reduce the cost without separately requiring an additional camera or the like.

Further, according to the embodiment, when the determination unit 144 determines that the estimated bump height by the estimation unit 143 is equal to or more than the predetermined value, the communication control unit 145 transmits the transmission information including the position information of the vehicle 1 acquired by the acquisition unit 141 and the bump height estimated by the estimation unit 143 to the server or the other vehicle through the network to the transmission unit 12. Thus, the other vehicle can select the optimum traveling route when selecting the traveling route to be traveled, and it is possible to prevent the lower surface of the vehicle from being rubbed or damaged due to the step of the road surface, or from becoming impossible to escape.

In the description of the flowchart in the present specification, it has been clarified the relationship before and after the processing between the steps using expressions such as "first," "thereafter," "following," etc., the order of the processing necessary for carrying out the present embodiment is not uniquely defined by their expressions. That is, the order of processing in the flowcharts described herein may be varied to the extent that there is no discrepancy.

Further effects and variations can be readily derived by one skilled in the art. The broader aspects of the disclosure are not limited to the specific details and representative embodiments expressed and described above. Accordingly, various changes may be made without departing from the spirit or scope of the overall concept of the present disclosure defined by the appended claims and their equivalents.

While some of the embodiments of the present application have been described in detail based on the drawings, these are illustrative, and it is possible to implement the present disclosure in other forms which are variously modified and improved based on the knowledge of those skilled in the art, starting from the aspects described in the column of the disclosure of the present disclosure.

According to an embodiment, there is provided an effect that an inexpensive and simple configuration can be achieved.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bump detector for detecting a bump on a road surface where a vehicle travels, comprising:

a processor configured to:

acquire a motor torque of a motor connected to a tire, a tire angular acceleration, a motor angular acceleration, and speed information of the vehicle, calculate a force in a horizontal direction acting on the tire when the tire rides on the bump, estimate a bump height in accordance with the force in the horizontal direction on a basis of bump information, in which peaks of a tire front-rear force in the horizontal direction before and after the tire rides on the bump on the road surface are calculated in advance for each vehicle speed and that are associated with bump heights, and the speed information, and determine whether the estimated bump height is equal to or greater than a predetermined value, and transmit the estimated bump height and position information of the vehicle to an external server or another vehicle to enable selection of an optimum traveling route in response to the estimated bump height being equal to or greater than the predetermined value.

2. The bump detector according to claim 1, wherein the processor is further configured to:

acquire the position information of the vehicle, and transmit transmission information, in which the position information is associated with the estimated bump height, to the external server or the another vehicle in response to determining that the estimated bump height is equal to or greater than the predetermined value.

3. The bump detector according to claim 1, wherein the processor is further configured to:

refer, in response to velocity information of the vehicle being a second predetermined value, to first linear information of bump information recorded by the processor; and estimate the bump height based on the first linear information.

4. The bump detector according to claim 1, wherein the external server or the another vehicle is configured to select and control the optimum traveling route when selecting a traveling route to be traveled by the vehicle in response to transmitting the estimated bump height.

5. A vehicle comprising:

the bump detector according to claim 1; and one or more sensors configured to acquire the motor torque, the tire angular acceleration, the motor angular acceleration, and the speed information.

* * * * *